J. JONES.
FISHHOOK.
APPLICATION FILED MAR. 15, 1919.
1,312,734.
Patented Aug. 12, 1919.
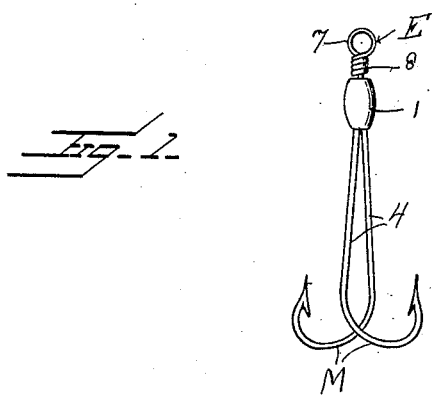
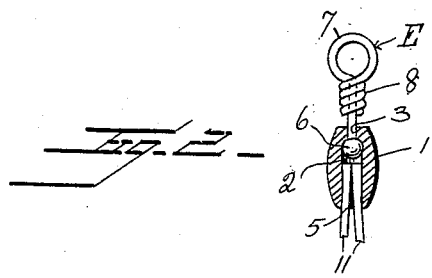
Inventor
Jacob Jones
By Watson E. Coleman
Attorney

UNITED STATES PATENT OFFICE.

JACOB JONES, OF RINGLING, MONTANA, ASSIGNOR OF ONE-HALF TO TILLIE THEIS, OF BUTTE, MONTANA.

FISHHOOK.

1,312,734.  Specification of Letters Patent.  Patented Aug. 12, 1919.

Application filed March 15, 1919. Serial No. 282,784.

*To all whom it may concern:*

Be it known that I, JACOB JONES, a citizen of the United States, residing at Ringling, in the county of Meagher and State of Montana, have invented certain new and useful Improvements in Fishhooks, of which the following is a specification, reference being had to the accompanying drawings.

This invention relates to certain improvements in fish hooks and it is an object of the invention to provide a novel and improved device of this general character embodying a plurality of hook members coacting in a manner whereby the same will effectually hold the fish.

It is also an object of the invention to provide a device of this general character having novel and improved means whereby the bait may be readily and conveniently applied.

A still further object of the invention is to provide a novel and improved device of this general character comprising a body with which the hooks proper are engaged, together with an eye member in swivel engagement with the body and which member is adapted for engagement with the line.

The invention consists in the details of construction and in the combination and arrangement of the several parts of my improved fish hook whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in elevation of a fish hook constructed in accordance with an embodiment of my invention, and Fig. 2 is a fragmentary view, partly in section and partly in elevation, illustrating in detail the assembly of the various parts comprised in the device.

As disclosed in the accompanying drawings, 1 denotes an elongated body formed of metal or other suitable material and which is provided in one end portion with a socket 2 extending substantially the entire length thereof and the opposite end portion of the body is provided with a restricted opening 3 in communication with the base portion of the socket 2.

Extending within the socket 2 are the extremities of the resilient shanks 4 of the hook members M and said extremities of the shanks 4 are held within the socket by solder or the like, as indicated at 5. The hook members are in reversed or crossed relation, as illustrated in Fig. 1, and the resiliency of the shanks 4 serve to urge the members M outwardly. Normally the shanks 4 converge toward the body 1 so that a space is afforded therebetween and wherein bait, and particularly live bait, may be clamped therebetween. When it is desired to apply the bait, it is only necessary to press upon the hook ends of the members M and after the bait has been applied the inherent resiliency of the shanks 4 will maintain the bait against displacement.

E denotes an eye member formed of a single length of material and provided at one end with an enlargement 6. Initially, and before the shanks 4 have been engaged within the socket 2, the strand of material is threaded through the opening 3 to position the head 6 within the inner or base portion of the socket 2. The extended portion of the strand is then bent upon itself to form the eye-member 7 and the adjacent end portion of said strand is wrapped around the strand, as indicated at 8, immediately adjacent the eye 7.

The eye 7 affords means whereby the hook may be readily engaged with the line and, as illustrated in Fig. 2, the connection between the member E and the body 1 is of a swivel type.

The resiliency of the shanks 4 also facilitates the catching of the fish as said hook members are contracted, one relative to the other, as the same enters the mouth of the fish, and the resultant relative expansion assures an effective penetration of the members M.

From the foregoing description, it is thought to be obvious that a fish hook constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A device of the class described comprising a body having a socket produced in the face thereof and having an opening in an opposed face in communication with the base of the socket, an eye member including a portion disposed through the opening and provided with an enlargement arranged within the base portion of the socket, and hook members including resilient shanks extending within the socket and secured therein, said hook members being reversely directed and in crossed relation.

2. A device of the class described comprising a body having a socket produced in the face thereof and having an opening in an opposed face in communication with the base of the socket, an eye member including a portion disposed through the opening and provided with an enlargement arranged within the base portion of the socket, and members including resilient shanks extending within the socket and secured therein, said members being in crossed relation.

In testimony whereof I hereunto affix my signature in the presence of two witnesses.

JACOB JONES.

Witnesses:
JOHN GIBSON,
GUY C. MATHER.

Copies of this patent may be obtained for five cents each, by addressing the "Commissioner of Patents, Washington, D. C."